(12) United States Patent
Kaiser et al.

(10) Patent No.: US 9,784,320 B2
(45) Date of Patent: Oct. 10, 2017

(54) METHOD FOR PRODUCING A COMPOSITE ROLLING BEARING

(75) Inventors: Andreas Kaiser, Werneck (DE); Peter Niebling, Bad Kissingen (DE); Roland Langer, Schwanfeld (DE); Frank Eichelmann, Hassfurt (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 736 days.

(21) Appl. No.: 14/237,271

(22) PCT Filed: Jun. 25, 2012

(86) PCT No.: PCT/EP2012/062185
§ 371 (c)(1),
(2), (4) Date: Feb. 5, 2014

(87) PCT Pub. No.: WO2013/020750
PCT Pub. Date: Feb. 14, 2013

(65) Prior Publication Data
US 2014/0208593 A1    Jul. 31, 2014

(30) Foreign Application Priority Data
Aug. 10, 2011 (DE) .......................... 10 2011 080 738

(51) Int. Cl.
*F16C 35/06* (2006.01)
*F16C 43/08* (2006.01)
(Continued)

(52) U.S. Cl.
CPC ............. *F16C 43/086* (2013.01); *B21H 1/12* (2013.01); *F16C 19/185* (2013.01);
(Continued)

(58) Field of Classification Search
CPC .... F16C 43/086; F16C 35/063; F16C 19/185; F16C 2229/00; F16C 2326/02;
(Continued)

(56) References Cited

U.S. PATENT DOCUMENTS 4,125,298 A    11/1978 Heurich et al.
4,893,960 A    1/1990 Beier et al.
(Continued)

FOREIGN PATENT DOCUMENTS

CN    1443119    9/2003
CN    101415965    4/2009
(Continued)

*Primary Examiner* — Jun Yoo
(74) *Attorney, Agent, or Firm* — Davidson, Davidson & Kappel, LLC

(57) ABSTRACT

A method for producing a composite rolling bearing (1) having a bearing flange (3) and at least one rolling bearing (4, 5) held on the bearing flange (3) by an inner ring (6, 7). In order to be able to fix the inner ring (7) on the bearing flange (3) with axial preloading without expansion, the inner ring (7) is acted upon by a holding-down device (23) that radially holds down the inner ring (7) and is preloaded against the inner ring (7) by a regulated axial force (F), and, by way of an advancing cone (21) introduced radially on the inside axially into the bearing flange (3), material (11) present on the bearing flange (3) is displaced radially towards the outside into a recessed formation (15, 16) in the inner ring (7).

5 Claims, 6 Drawing Sheets

(51) Int. Cl.
  *B21H 1/12* (2006.01)
  *F16C 35/063* (2006.01)
  *F16C 19/18* (2006.01)
  *F16C 33/58* (2006.01)

(52) U.S. Cl.
  CPC .......... *F16C 35/063* (2013.01); *F16C 33/586* (2013.01); *F16C 2229/00* (2013.01); *F16C 2326/02* (2013.01); *Y10T 29/49682* (2015.01)

(58) Field of Classification Search
  CPC ...... F16C 33/586; F16C 35/067; F16C 43/04; B21H 1/12; Y10T 29/49682; B23P 11/00; B23P 11/005; B60B 27/0005; B60B 27/00
  See application file for complete search history.

(56) References Cited

U.S. PATENT DOCUMENTS

| | | | |
|---|---|---|---|
| 6,702,472 B2 * | 3/2004 | Sera | B60B 27/00 384/489 |
| 6,926,448 B2 | 8/2005 | Ouchi | |
| 7,857,520 B2 * | 12/2010 | Langer | B60B 27/0005 384/544 |
| 8,677,596 B2 | 3/2014 | Furukubo et al. | |
| 8,814,278 B2 | 8/2014 | Enomoto et al. | |
| 2003/0081872 A1 | 5/2003 | Sahashi et al. | |
| 2004/0101224 A1 | 5/2004 | Umekida | |
| 2004/0158988 A1 | 8/2004 | Ozawa et al. | |
| 2004/0234182 A1 | 11/2004 | Tajima et al. | |
| 2008/0148893 A1 | 6/2008 | Langer et al. | |
| 2010/0303395 A1 | 12/2010 | Langer et al. | |
| 2011/0241416 A1 | 10/2011 | Kaiser et al. | |

FOREIGN PATENT DOCUMENTS

| | | |
|---|---|---|
| CN | 101683680 | 3/2010 |
| DE | 26 11 218 | 10/1977 |
| DE | 100 29 100 | 3/2001 |
| DE | 60119679 | 4/2007 |
| DE | 10 2008 064 155 A1 | 7/2010 |
| DE | 102009023042 | 7/2010 |
| EP | 1 396 354 | 3/2004 |
| EP | 1403095 | 3/2004 |
| JP | 2001-18605 | 1/2001 |
| JP | 2010-42733 | 2/2010 |
| RU | 2310107 | 6/2007 |
| RU | 2375180 | 12/2009 |
| SU | 532705 | 10/1971 |
| WO | WO 2006/105748 | 10/2006 |

* cited by examiner

METHOD FOR PRODUCING A COMPOSITE ROLLING BEARING

A method for producing a composite rolling bearing having a bearing flange and at least one rolling bearing held on the bearing flange by means of an inner ring.

BACKGROUND

Composite rolling bearings of the type in question are used as wheel bearings in motor vehicles, for example, wherein the bearing flange accommodates at least one, preferably two, rolling bearings arranged axially adjacent to one another and having inner rings. In this arrangement, the inner rings are mounted on the bearing flange under an axial preload. DE 10 2008 064 155 A1 discloses a rotary forming method for producing a riveting collar on the bearing flange, in which a riveting collar is obtained from a flange part extending axially along the axis of rotation of the rolling bearings by forming the end face radially. In this process, rollers of a feed cone, which are set at an angle relative to the axis of rotation, form the riveting collar. Compared with conventional riveting involving a rolling action, there is a risk, admittedly reduced but still present, that the adjacent inner ring will be expanded. In the case of inner rings of sufficiently stable design, the overall height disadvantageously requires an increased installation space. The radial forming entails poor control over the axial preloading of the inner ring on the bearing flange. Moreover, the large angles of incidence of the rollers, in particular, lead to relatively high tool wear in the case of high forming forces.

SUMMARY OF THE INVENTION

It is an object of the present invention to provide a method for producing a composite rolling bearing in which expansion of the inner ring is avoided and the setting of the axial preload of the inner rings or of the inner ring can be set precisely.

The present invention provides a method for producing a composite rolling bearing having a bearing flange and at least one rolling bearing held on the bearing flange by means of an inner ring, wherein the inner ring is acted upon by means of a holding-down means that radially holds down the inner ring and is preloaded against the inner ring by a controlled axial force, and, by way of a feed cone introduced radially on the inside axially into the bearing flange, reserve material on the bearing flange is displaced radially outward into a recessed formation in the inner ring.

According to the method proposed, in contrast to the riveting method, material of the bearing flange is not reshaped radially outward but is displaced radially outward in order to produce an axial preload and axial fixing of the single or outer inner ring closer to the end of the bearing flange, wherein the holding-down means stabilizes the inner ring radially toward the outside and can form an axial stop for the displaced material. Here, an axial stop is formed for the inner ring, with the inner ring being axially preloaded by the holding-down means during the material displacement process by the latter being acted upon by a controlled axial force. In this way, displacement or deformation of the inner ring is not possible. At the same time, the axial fixing of the inner ring is accomplished with a constant, adjustable preload. Stabilizing the inner ring by means of the holding-down means during the process enables the inner ring to be given smaller dimensions and, overall, enables the composite rolling bearing to be designed with a smaller installation space and a lower weight since these definitive variables need no longer be designed according to the method but according to requirements during operation.

According to an advantageous method, the reserve material is displaced at least partially by the feed cone or by rollers mounted on the feed cone. During this process, the feed cone is rotated and displaced axially with a predetermined feed, wherein the material overhanging radially inward relative to the inner circumference of the bearing flange is displaced radially outward, and a corresponding quantity of material is formed on the outer circumference of the bearing flange and is displaced into radially opposite recessed formations on the inner ring. During this process, the holding-down means, like the bearing flange, is supported in such a way that it does not rotate.

In an advantageous embodiment, for example, a material overhang formed radially on the inside on one end of the bearing flange as reserve material can be displaced into a chamfer formed radially on the inside as a recessed formation on one end of the inner ring. During this process, the holding-down means, which is extended radially inward in a corresponding manner, can act as an end-located limiting wall for the displaced material, and the inner ring and the displaced material can be flush at the end. As an alternative, an annular collar of the bearing flange can be formed by setting back the wall provided on the holding-down means axially in a corresponding manner, said annular collar being extended axially relative to the end of the inner ring.

The wall can furthermore be provided as a die, e.g. in the form of end toothing, with the result that, given appropriate displacement of material in the end region of the bearing flange, end toothing is formed in the end of the bearing flange, resulting, in the case where the composite rolling bearing is designed as a wheel bearing with a corresponding profiling of a drive shaft, in joining of the bearing flange to the drive shaft for conjoint rotation, requiring only axial clamping of the composite assembly. As an alternative, end toothing of this kind can be introduced into the bearing flange in advance, in which case displacement of material is not envisaged in the region of the end of the bearing flange. As an alternative, the end toothing can be introduced in advance and displacement of material on the end of the bearing flange can be envisaged if the end toothing is protected by a complementarily shaped wall of the holding-down means.

As an alternative or in addition, a material overhang formed radially toward the inside can be provided as reserve material on the inner circumference of the bearing flange at an axial distance from the end of the latter, said material being displaced into a recessed formation at an axial distance from one end of the inner ring. The recessed formation can be an annular groove or the like, for example.

In order to achieve advantageous centering of the holding-down means on the inner ring and good removal thereof after the method has been carried out, the holding-down means can be centered on a chamfer provided radially on the outside of the at least one inner ring, wherein the holding-down means is of an appropriately conical design in this region.

According to an advantageous embodiment, the holding-down means can fit over the inner ring radially on the inside and radially on the outside.

The formation of the material overhangs of reserve material makes it possible to keep the forming forces low. In this context, the forming forces can be modified through the forming angle of the rollers on the feed cone. For example, the feed and slope of the rollers can be set in accordance with a radial variation in an axial width of the reserve material. In this case, the axes of rotation of the rollers can be 10° to 20° to the axis of rotation of the inner ring, wherein the rollers can form on the inner circumference a recessed formation region which slopes relative to the substantially cylindrical inner surface.

BRIEF DESCRIPTION OF THE DRAWINGS

The invention is explained in greater detail by means of the illustrative embodiments shown in FIGS. 1 to 11, where.

DETAILED DESCRIPTION

Figure 1:
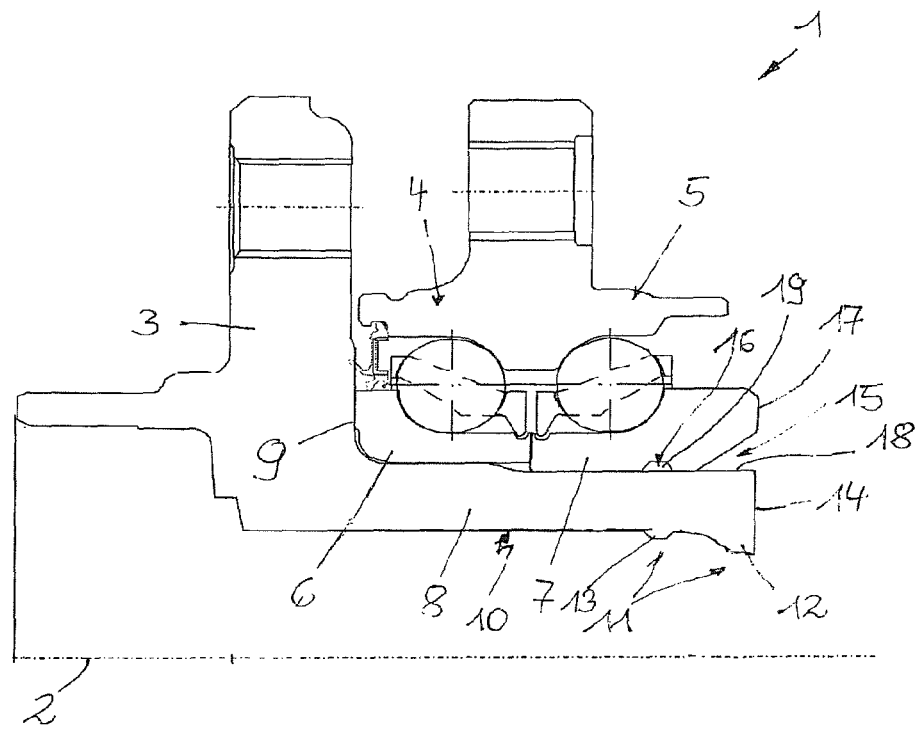
FIG. 1 shows an unprocessed form of a composite rolling bearing in partial section.

FIG. 1 shows a partial section through the composite rolling bearing 1 in unprocessed form arranged around the axis 2 of rotation. The bearing flange 3 accommodates two rolling bearings 4, 5, which are arranged axially adjacent to one another and the inner rings 6, 7 of which are mounted without play, by means of an interference fit, against the axial stop 9, on the flange part 8 arranged along and around the axis 2 of rotation.

The reserve material 11 in the form of the material overhangs 12, 13 is extended out of the cylindrical surface 10 radially inward and in a ring over the circumference of the inner circumference of the bearing flange 3. At the end 14 of the bearing flange 3, material overhang 12 has a substantially wedge shaped cross section which widens radially in the direction of the end 14. Material overhang 13 is at an axial distance from the end 14 in the direction of the axial stop 9.

Recessed formations 15, 16 complementary to the material overhangs 12, 13 are provided in the inner ring 7, which are off-tool features or are machined into the inner ring 7 subsequently. The ends 14, 17 of the bearing flange 3 and of the inner ring 7 are formed axially flush, with the result that recessed formation 15 is formed as an outward-opening chamfer 18. Recessed formation 16 is designed as an annular groove 19.

Figure 2:
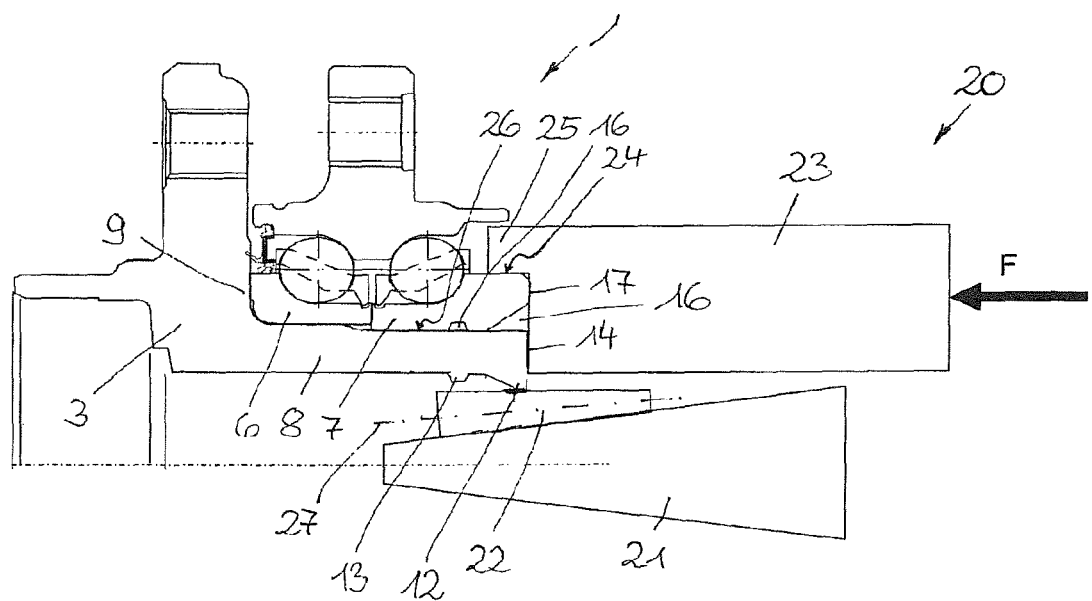
FIG. 2 shows the unprocessed form of FIG. 1 with the forming tool applied, in partial section.

FIG. 2 shows the unprocessed form of the composite rolling bearing 1 with the roll-forming tool 20 (shown schematically) applied at the beginning of the roll-forming process, said tool being formed by the feed cone 21 with the rollers 22, such as forming rollers, mounted rotatably thereon, the holding-down means 23 and the corresponding bearing arrangements (not shown) for the composite rolling bearing 1, the feed cone 21 and the holding-down means 23 as well as driving and control devices thereof At the beginning of the roll-forming process, the holding-down means 23 is applied to the ends 14, 17 of the bearing flange 3 and of the inner ring 7, with a selected axial force F, which is controlled during the roll-forming process, being input, thus enabling a predetermined preload on the inner rings 6, 7 relative to the axial stop 9 of the bearing flange 3 to be set.

The holding-down means 23 fits around the outer circumference 24 of the inner ring 7 by means of the shoulder 25, which is extended axially relative to the end 17 and which can be in the form of a ring or of a ring segment, and thus fixes the inner ring 7 radially on the outer circumference 26 of the flange part 8, preventing the latter from undergoing any radial expansion in the subsequent roll-forming process.

During the roll-forming process, the feed cone 21 with the rollers 22 mounted thereon in an axially fixed manner which allows rotation about the axis 27 of rotation is moved axially, as a result of which the reserve material in the form of the material overhangs 12, 13 is rolled radially inward as the rollers 22 rotate, beginning with material overhang 12.

Figure 3:
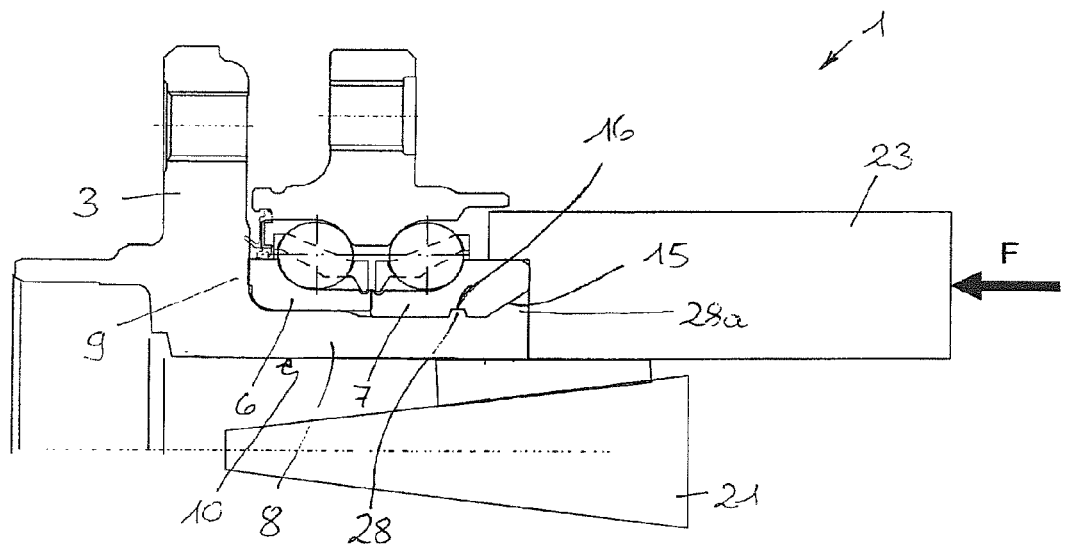
FIG. 3 shows the composite rolling bearing in the finished state in partial section.

As can be seen from FIG. 3, the rolled-in material in the final state of the roll-forming process has displaced material 28, 28a displaced material from the flange part 8 into the recessed formations 15, 16 in the finished composite rolling bearing 1. In this case, material from the flange part 8 is displaced into the recessed formations 15, 16, with the result that, with a preload being applied to the holding-down means 23, the inner rings 6, 7 are fixed axially on the bearing flange 3 with a constant preload against the axial stop 9.

After the roll-forming process, the surface 10 of the inner circumference of the bearing flange is substantially cylindrical, and the feed cone 21 and the holding-down means 23 are moved back.

Figure 4:
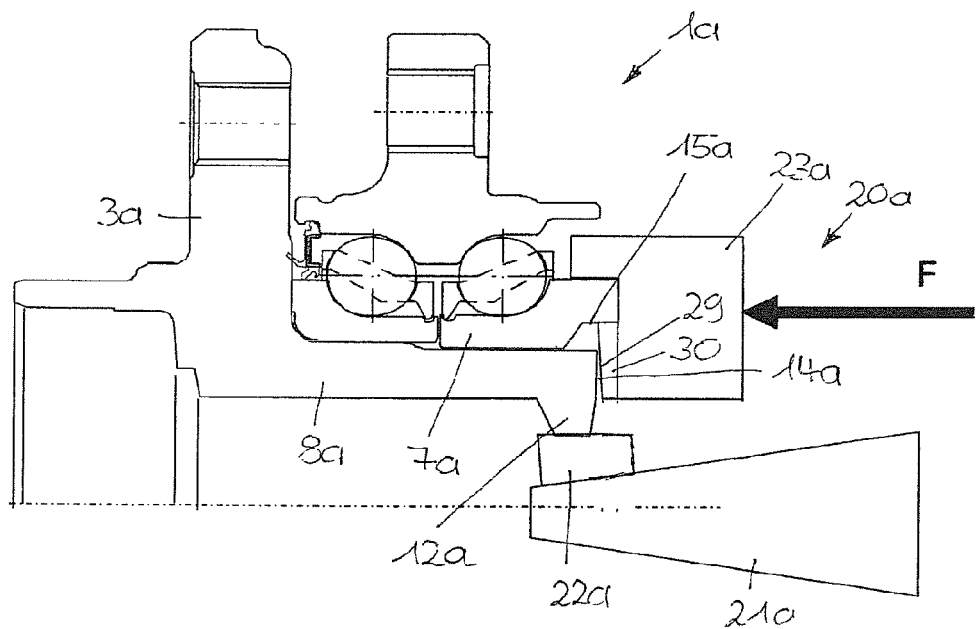
FIG. 4 shows a composite rolling bearing modified as compared with the composite rolling bearing in FIGS. 1 to 3, in the unprocessed form, having end toothing to be formed, in partial section.

FIG. 4 shows a variant of a composite rolling bearing 1a in unprocessed form with a roll-forming tool 20a adapted thereto. Here, the inner ring 7a is extended axially relative to the flange part 8a of the bearing flange 3a. The material overhang 12a is arranged at the end 14a of the flange part 8a, being extended radially inward. The inner ring 7a has a corresponding recessed formation 15a. The holding-down means 23a is designed as a die 30 in the form of axial toothing on its wall 29 facing the end 14a.

At the beginning of the roll-forming process, the holding-down means 23a is subjected to the axial force F, and the feed cone 21a is moved axially, rotating the rollers 22a. As a result, the material overhang 12a is displaced radially outward, as a result of which displaced material flows out of the flange part 8a into the recessed formation 15a on the inner ring 7a. During this process, end toothing is formed on the end 14a by the die 30.

Figure 5:
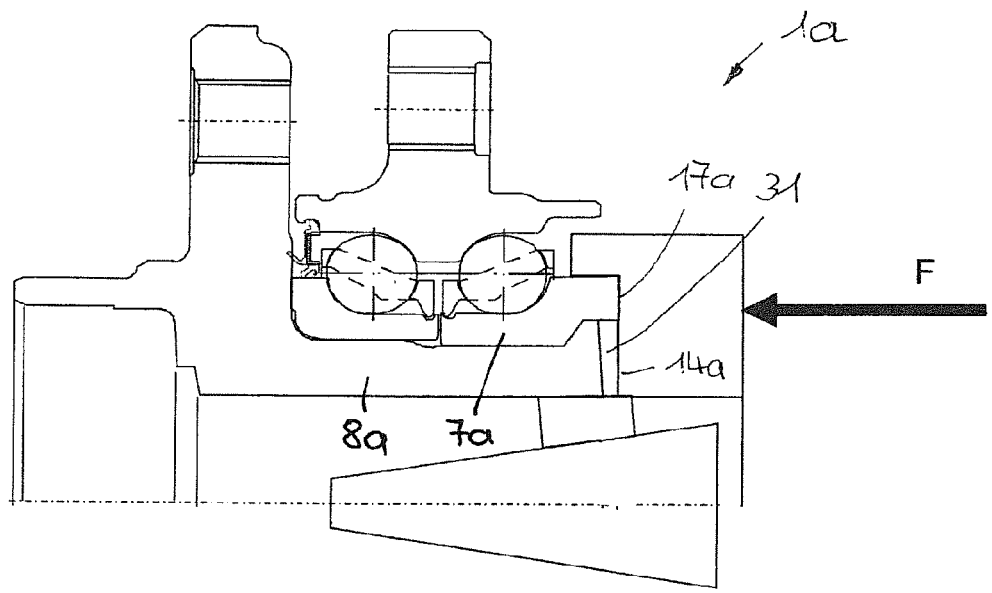
FIG. 5 shows a partial section of the composite rolling bearing in FIG. 4 in the finished state.

FIG. 5 shows the finished composite rolling bearing 1a of FIG. 4 with end toothing 31, which has been formed in the flange part 8a in relation to the ends 14a and 17a of the flange part 8a and of the inner ring 7a respectively and can form a connection for conjoint rotation with another component, e.g. a drive shaft in the case of a wheel bearing.

Figure 6:
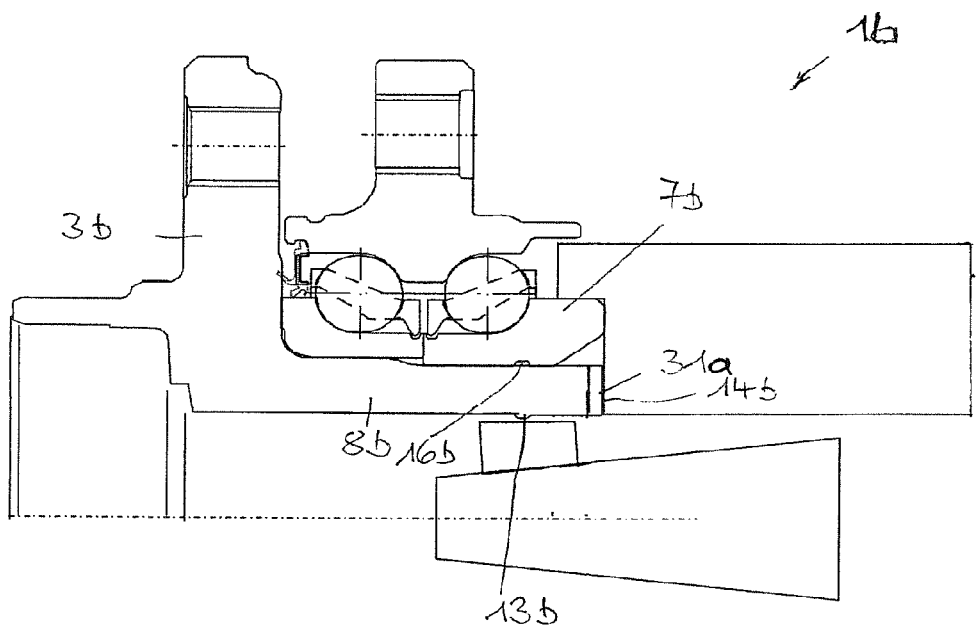
FIG. 6 shows an unprocessed form of a composite rolling bearing with end toothing introduced even before the process of material displacement, in partial section.

FIG. 6 shows another variant of a composite rolling bearing 1b having end toothing 31a already provided before the roll-forming process. Consequently, only the material overhang 13b at an axial distance from the end 14b on the flange part 8b of the bearing flange 3b and a correspondingly oppositely situated recessed formation 16b on the inner ring 7b are provided.

Figure 7:
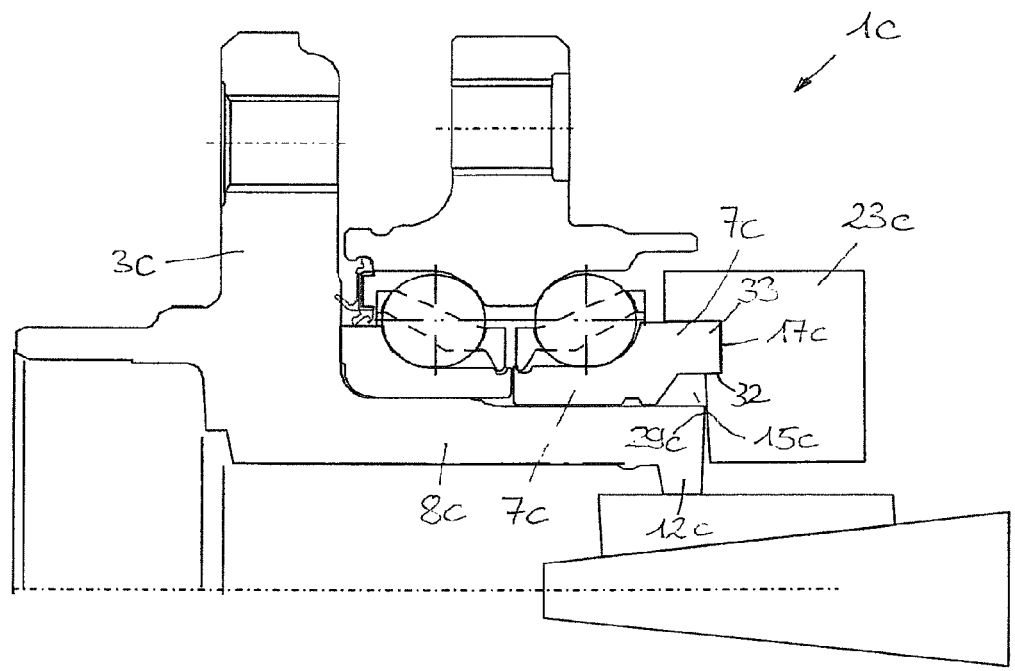
FIG. 7 shows an unprocessed form of a composite rolling bearing with the holding-down means fitted over the inner ring radially on the inside and outside, in partial section.

FIG. 7 shows a variant in the form of the composite rolling bearing 1c, over the inner ring 7c of which the holding-down means 23c fits from both sides, i.e. radially on the inside and radially on the outside. Here, the wall 29c of the holding-down means 23c is provided axially with the recess 32 opposite the end 17c of the inner ring 7c, with the result that, after the displacement of the material overhang 12c, the recessed formation 15c is filled with displaced material in such a way that the inner ring 7c forms the overhang 33 axially relative to the flange part 8c of the bearing flange 3c.

Figure 8:
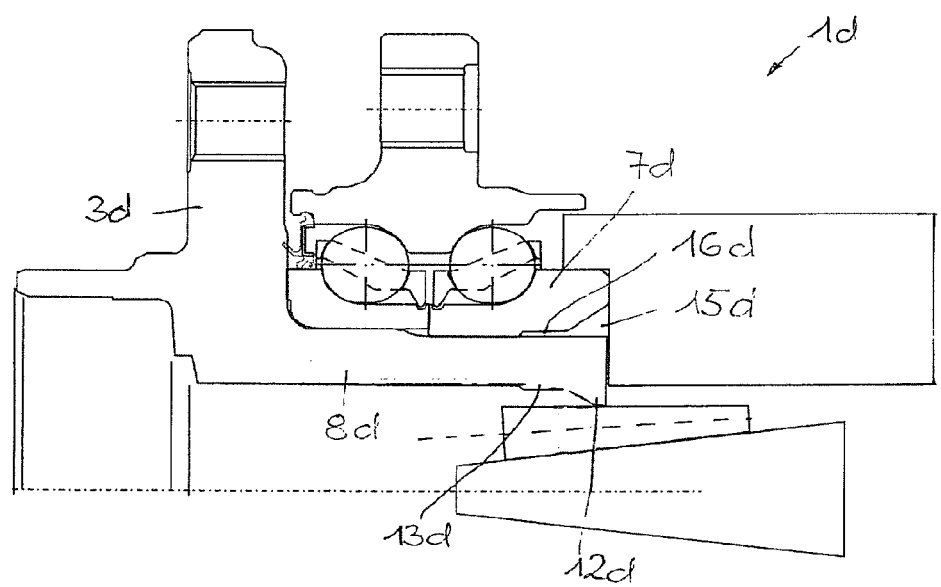
FIG. 8 shows an unprocessed form of a composite rolling bearing with a material overhang stepped radially toward the outside from the end of the bearing flange, in partial section.

FIG. 8 shows a variant in the form of the composite rolling bearing 1d in which the material overhangs 12d, 13d of the flange part 8d of the bearing flange 3d merge into one another in a stepped manner. The recessed formations 15d, 16d are provided radially opposite in a complementary manner on the inner ring 7d.

Figure 9:
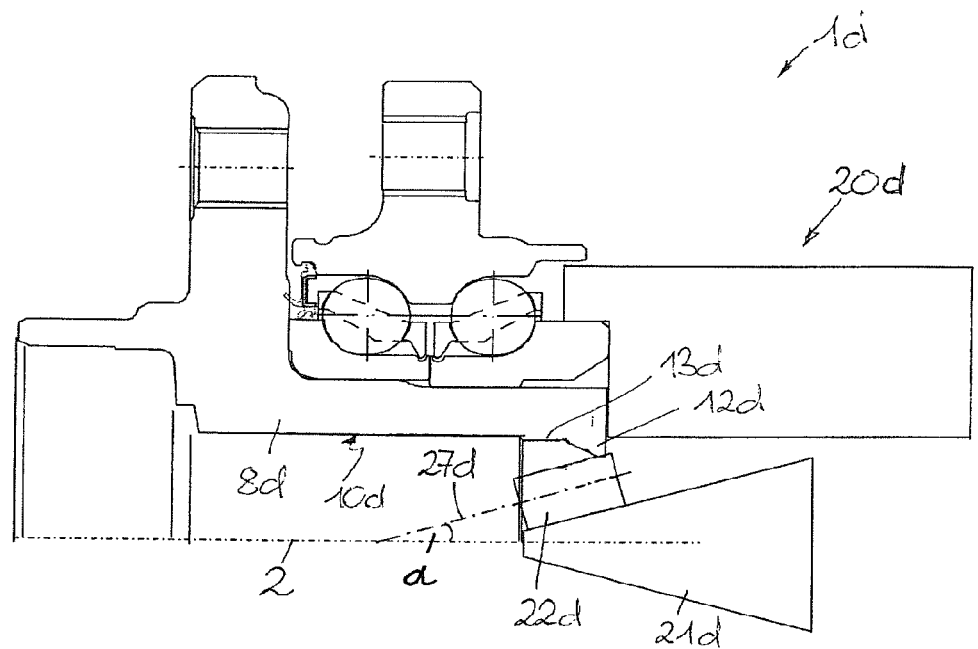
FIG. 9 shows an unprocessed form of a composite rolling bearing with material overhangs formed relative to the axis of rotation of the inner ring by steeply angled rollers of the feed cone, in partial section.

Whereas the rollers 22 in the preceding figures displace the material overhangs radially outward substantially perpendicularly to the axis 2 of rotation (FIG. 1), a variant of a roll-forming tool 20d for displacing the material overhangs 12d, 13d of the flange part 8d of the composite rolling bearing 1d of FIG. 8 is shown in FIG. 9. The axes 27d of rotation ring 1d of FIG. 8 is shown. The axes 27d of rotation of the of the rollers 22d accommodated in the feed cone 21d have a large angle α of inclination, e.g. between 15° and 25°, relative to the axis 2 of rotation of the composite rolling bearing 1d, leading to the rollers 22d displacing the material overhangs 12d, 13d obliquely, as a result of which the expenditure of force for displacement of material is lower. In the final state of the roll-forming process, a displacement surface inclined relative to the surface 10d of the flange part 8d is provided, forming an undercut which can be used for other purposes and on which other components can be snapped or hooked.

Figure 10:
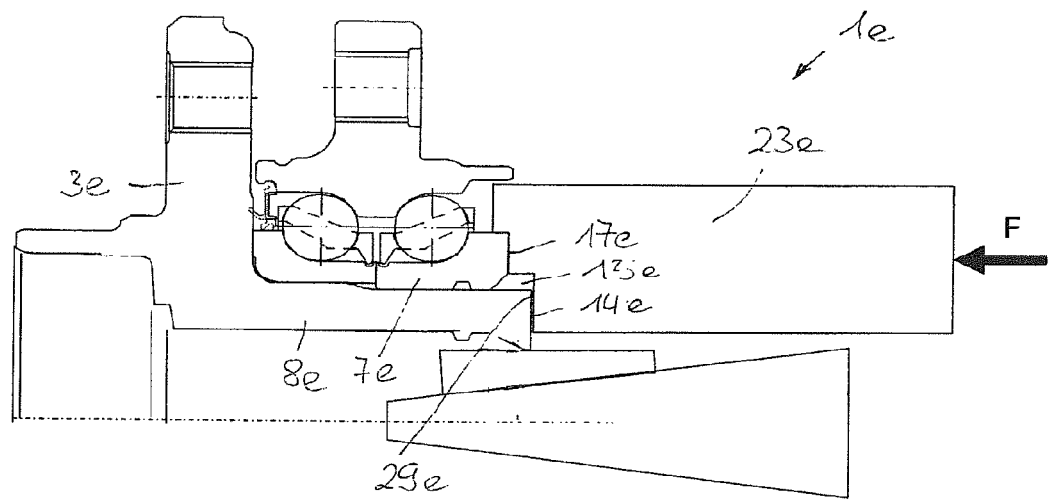
FIG. 10 shows an unprocessed form of a composite rolling bearing with a wall of the holding-down means which is set back axially relative to an end of the inner ring, in partial section.

FIG. 10 shows a variant in the form of a composite rolling bearing 1e having ends 14e, 17e of the flange part 8e of the bearing flange 3e and of the inner ring 7e, respectively, which are axially spaced apart, wherein the flange part 8e is extended axially relative to the inner ring 7e. Accordingly, the holding-down means 23e is provided with an axially stepped wall 29e to form the recessed formation 15e and to subject the inner ring 7e to the axial force F.

Figure 11:
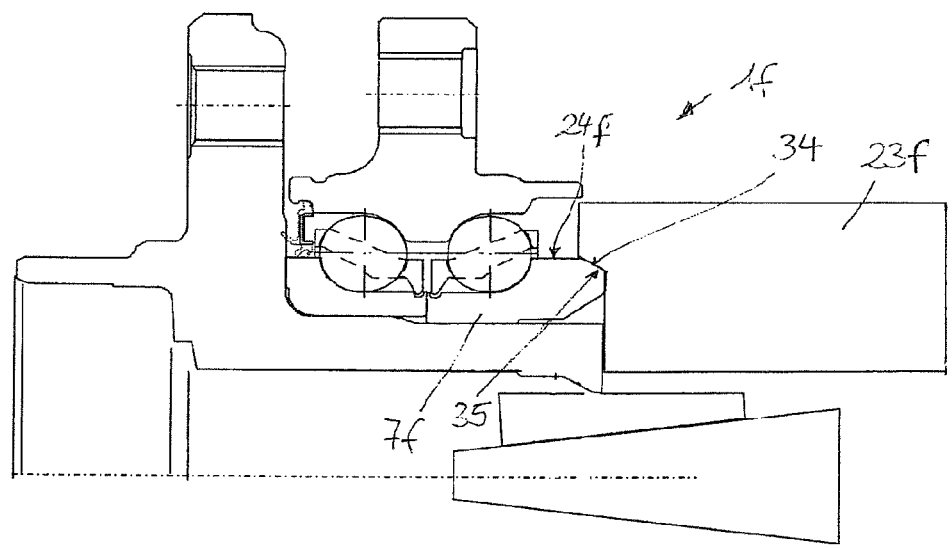
FIG. 11 shows a partial section of an unprocessed form of a composite rolling bearing having holding-down means centered conically on the inner ring.

FIG. 11 shows a variant in the form of the composite rolling bearing 1f in which the inner ring has the centering chamfer 34 on the outer circumference 24f thereof for centering the holding-down means 23f. Accordingly, the holding-down means has the centering cone 35.

LIST OF REFERENCE SIGNS 1 composite rolling bearing
1a composite rolling bearing
1b composite rolling bearing
1c composite rolling bearing
1d composite rolling bearing
1e composite rolling bearing
1f composite rolling bearing
2 axis of rotation
3 bearing flange
3a bearing flange
3b bearing flange
3c bearing flange
3d bearing flange
3e bearing flange
4 rolling bearing
5 rolling bearing
6 inner ring
7 inner ring
7a inner ring
7b inner ring
7c inner ring
7d inner ring
7e inner ring
7f inner ring
8 flange part
8a flange part
8b flange part
8c flange part
8d flange part
8e flange part
9 axial stop
10 surface
10d surface
11 reserve material
12 material overhang
12a material overhang
12c material overhang
12d material overhang
13 material overhang
13b material overhang
13d material overhang
14 end
14a end
14b end
14e end
15 recessed formation
15a recessed formation
15c recessed formation
15d recessed formation
15e recessed formation
16 recessed formation
16b recessed formation
16d recessed formation
17 end
17a end
17c end
17e end
18 chamfer
19 annular groove
20 roll-forming tool
20a roll-forming tool
20d roll-forming tool
21 feed cone
21a feed cone
21d feed cone
22 roller
22a roller
22d roller
23 holding-down means
23a holding-down means
23c holding-down means
23e holding-down means
23f holding-down means
24 outer circumference 24f outer circumference
25 shoulder
26 outer circumference
27 axis of rotation
27d axis of rotation
28 displaced material
28a displaced material
29 wall
29c wall
29e wall
30 die
31 end toothing
31a end toothing
32 recess
33 overhang
34 centering chamfer
35 centering cone
F axial force
α angle of inclination

What is claimed is:

1. A method for producing a composite rolling bearing having
a bearing flange and at least one rolling bearing held on the bearing flange by an inner ring, the method comprising:
acting on the inner ring by a holding-down device radially holding down the inner ring and preloaded against the inner ring by a controlled axial force;
displacing, by way of a feed cone introduced radially on the inside axially into the bearing flange, reserve material on the bearing flange radially outwardly into a recessed formation in the inner ring, the reserve material, prior to the displacing, extending radially inwardly from an inner circumference of the bearing flange; and
wherein the holding-down device deforms end toothing into the bearing flange during a roll-forming process.

2. The method as recited in claim 1 wherein the reserve material is displaced at least partially by rollers arranged rotatably on the feed cone.

3. The method as recited in claim 1 wherein a material overhang formed radially on the inside on one end of the bearing flange as the reserve material is displaced into a chamfer formed radially on the inside as the recessed formation on one end of the inner ring.

4. The method as recited in claim 1 wherein a material overhang formed radially on the inside at an axial distance from one end of the bearing flange as the reserve material is displaced into the recessed formation at an axial distance from one end of the inner ring.

5. The method as recited in claim 1 wherein an angle of inclination between an axis of rotation of rollers of the feed cone and the axis of rotation of the composite rolling bearing is set in accordance with a radial variation in an axial width of the reserve material.

* * * * *